2 Sheets—Sheet 1.

J. PRICE.
EXCAVATORS AND DUMPING CARTS

No. 183,326. Patented Oct. 17, 1876.

Witnesses
Geo. H. Strong
Jno. L. Borne

Inventor
Jacob Price
by Dewey
Atty

2 Sheets—Sheet 2.
J. PRICE.
EXCAVATORS AND DUMPING CARTS.
No. 183,326. Patented Oct. 17, 1876.
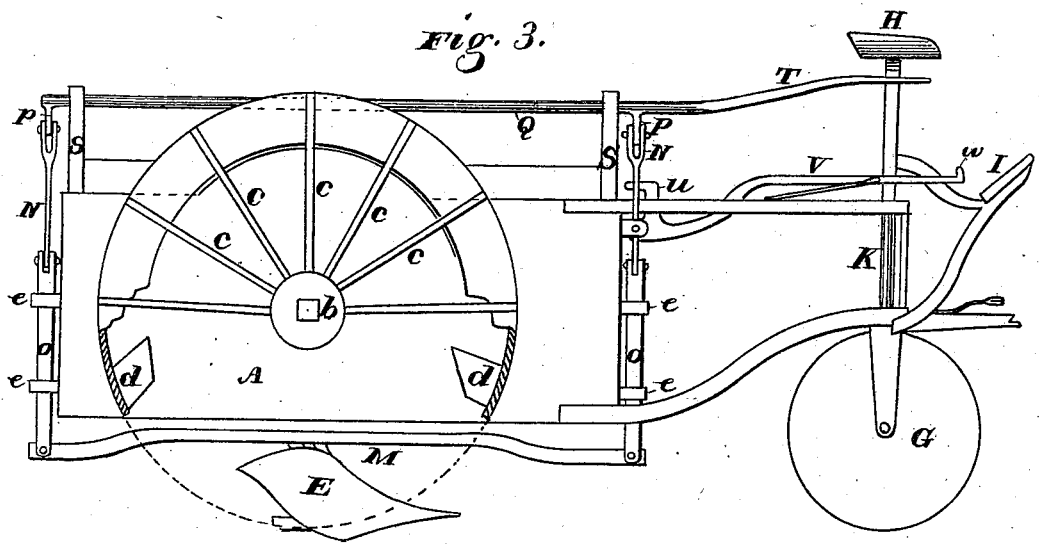
Fig. 3.
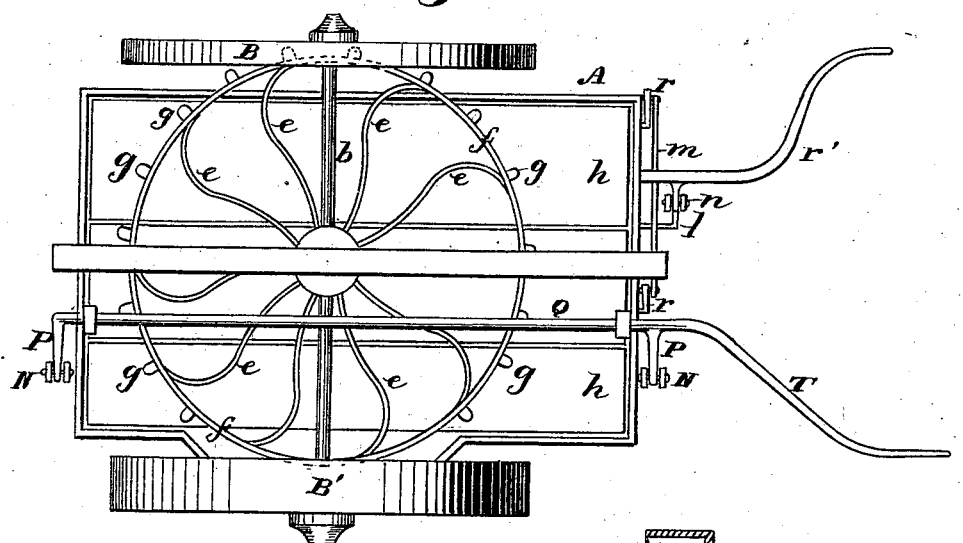
Fig. 4.
Fig. 5.
Witnesses
Geo. H. Strong
Jno. L. Bone
Inventor
Jacob Price
by Dewey
Atty.
N. PETERS, PHOTO-LITHOGRAPHER, WASHINGTON, D. C.

UNITED STATES PATENT OFFICE.

JACOB PRICE, OF SAN LEANDRO, CALIFORNIA.

IMPROVEMENT IN EXCAVATOR AND DUMPING-CART.

Specification forming part of Letters Patent No. 183,326, dated October 17, 1876; application filed February 21, 1876.

*To all whom it may concern:*

Be it known that I, JACOB PRICE, of San Leandro, Alameda county, State of California, have invented an Improved Combination Excavator and Dump Cart; and I do hereby declare the following description and accompanying drawings are sufficient to enable any person skilled in the art or science to which it most nearly appertains to make and use my said invention or improvement without further invention or experiment.

My invention relates to certain improvements in that class of excavating-machines on which a number of buckets are formed on the periphery of one of the bearing-wheels of a cart, so that the earth which is turned and deposited in the buckets by a plow attached below the cart-body will be lifted by the rotation of the wheel and deposited in the box or body of the cart until it is filled, when it can be transported to any desired place and dumped.

In order to describe my improvements so that others will understand their nature and operation, reference is had to the accompanying drawings, forming a part of this specification, in which—

Figure 1:
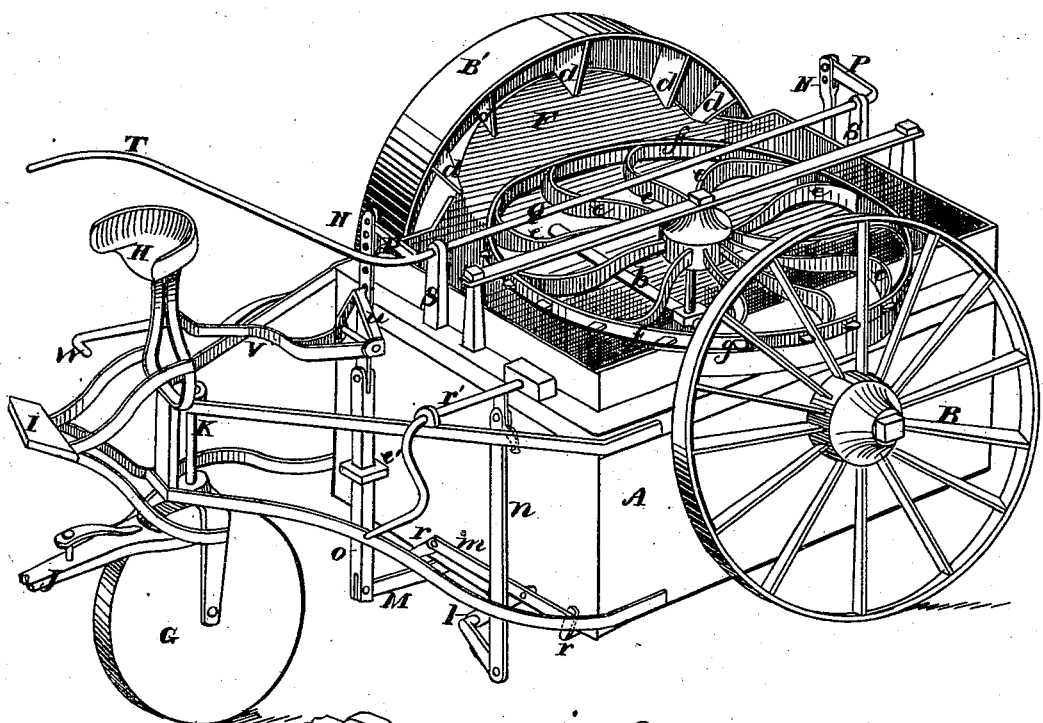
Figure 2:
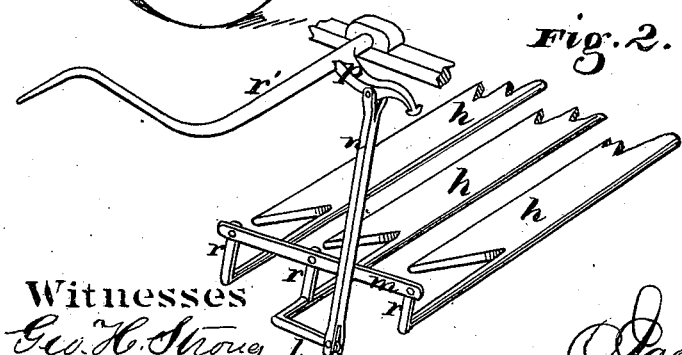

Figure 1, Sheet 1, is a perspective view of my machine. Fig. 2 is a view of the discharge bottom. Fig. 3, Sheet 2, is a longitudinal section. Fig. 4 is a plan view. Fig. 5 is a transverse section of the cutting, elevating, and distributing wheels.

Let A represent a cart body or box, which is mounted between the two bearing-wheels B B', so that the fixed axle $b$ which connects the two wheels will pass through the box above its middle line, thus permitting me to carry the load below the axle, at the same time lowering the box sufficiently to permit the buckets of the elevator-wheel to discharge themselves over the side of the box without decreasing its capacity.

If the box A was placed upon the axle $b$ it would have to be very shallow to allow the elevator-wheel to dump the earth into it; whereas by my arrangement I am able to use a large box, and carry its bottom close to the ground, so that it also serves as a convenient and suitable support for the plowing apparatus, as will be hereinafter described.

The elevator-wheel B' has a broad rim or tread, and the spokes $c\ c$ are connected with the outer edge of the rim, so as to give the entire space inside of them for the buckets, and to enable me to construct the wagon-body so that the buckets will empty themselves directly into it when they arrive at the proper angle.

The buckets are formed by attaching plates $d$ to the inside of the rim of the wheel, at an angle, or obliquely to the line of the axle which connects the wheels, so as to form buckets which are in a measure V-shaped, so that when the earth is turned against them by the plow E the edges of the plates $d$ will serve as scrapers to fill the buckets.

That side of that body or box A which is next to the elevating-wheel I construct with an extension, F, which projects outward at an angle into the space below the upper buckets of the wheel, and its upper edge is made circular to correspond with the curve of the wheel, and to fill up the space outside of the upper buckets, so as to prevent the dirt from falling outside of the wheel. This arrangement permits the buckets to dump their loads directly into the box, without the necessity of using chutes or carriers.

The front end of the cart I support by a single wheel, G, similar to a steering-wheel, and this wheel is connected with the front end of the cart-body by a strong metallic frame.

The seat H, foot-rest I, and pole J are all attached to the swivel-spindle K, which is supported by the front wheel, and which connects it with the metallic frame, so that they will all rotate simultaneously, thus giving great facility in guiding and turning the machine.

The plow E, which excavates and delivers the earth to the buckets of the wheel, is attached to a strong beam, M, which extends longitudinally beneath the box close to the elevating-wheel. This beam projects beyond the end of the box at each end, and a link, N, and bar O connect each of the projecting ends with the crank-arm P of a rock-shaft, Q, which extends across above the box, and is supported in upright standards S. The bars O are each guided by loops $e\ e$, which are attached to the end of the box.

The rock-shaft Q has a crank-handle, T, which extends forward to within easy reach of the driver when he is sitting on the seat H, so that he can, by partially rotating the rock-shaft, lower or elevate the plow into or out of the ground, as desired.

The crank-arm P can be adjusted up or down in holes in the upper end of the link N, so as to raise or lower the point of the plow, as required for plowing.

A spring-pawl, U, is arranged to engage with holes in the front link N, so as to retain the plow at the desired point.

A lever, V, which forms a part of this pawl, extends forward along the side of the driver's seat, and the end of this lever is formed into stirrup W, so that the driver can operate the pawl with his foot.

By this arrangement the plow will retain its plowing portion at any elevation, as both ends of the beam will be raised and lowered simultaneously.

To the middle of the fixed axle $b$, inside of the box A, I secure an upright shaft, $d'$, and upon the upper end of this shaft I place a horizontal wheel, so that it will be level with the top of the box. This wheel I call a spreading-wheel, as its office is to spread and distribute the earth as it accumulates in the box. This wheel is as large in diameter as the width of the box; and it consists of a series of radiating curved spreading-arms, $e\ e$, which connect the hub with the rim or band $f$. Teeth $g\ g$ are formed on the outer face of the rim or band $f$, which serve as cogs or teeth to engage the spokes of the carrying-wheel B as it revolves, and thus cause the spreading-wheel to rotate, or it can be driven in any other convenient manner. By the use of this spreading-wheel I am able to fill the box A level full, and thus obviate the objection heretofore made to this class of machines on account of the piling up of the earth upon the side of the box next to the elevating-wheel.

The bottom of the box A I construct of two or more hinged sections or valves, $h\ h\ h$. Each of these sections has a rod secured to one edge, and this rod extends through the ends of the box and serves as a journal for them to turn on. The front end of each rod outside of the box is formed into a crank, $r$, and all three of these cranks are connected by a bar, $m$. One of these cranks has a secondary crank, $l$, secured at right angles to it, and this secondary crank is connected by a pitman, $n$, with the arm $p$ of a crank-shaft, $r'$, which extends out from the front end of the box and is within easy reach of the driver.

The extremity of the arm $p$ of the crank-shaft $r'$ is curved or bent to one side, as shown, and the upper end of the pitman is attached to it at the bend, so that when the crank is turned so as to straighten the joint, the curved extremity will allow the joint to pass the vertical portion until the curved extension strikes the rod. This motion of the crank-shaft lifts or closes the valves or bottom sections so that the weight of the load bearing upon the bottom will be borne by this joint, and, owing to the position of the joint, the heavier the weight the greater the pressure upon the joint in a direction opposite to its movement on opening the valves. But, however great the strain upon this joint, a slight power applied to the crank $r$ will relieve the strain and straighten the joint, from which point the weight of the load will assist in opening the valves so that the load can be discharged through the bottom. With these improvements, this class of excavating, transporting, and dumping machines will be rendered convenient, effective and easy to operate.

Having thus described my invention, what I claim, and desire to secure by Letters Patent, is—

1. In combination with an earth-box, A, mounted upon wheels B B', one of which serves as an earth-elevator, a horizontal spreading and distributing wheel, $e\ e\ f$, provided with teeth $g\ g$ on its rim, which serve to engage with the spokes of one of the cart-wheels for the purpose of rotating the spreading-wheel, substantially as and for the purpose set forth.

2. In combination with the plow E of an excavating-machine, attached to the beam M, and connected with a rock-shaft, Q, which can be operated by the driver on his seat, the spring-pawl $u$, with its lever-extension $v$ and stirrup W, substantially as and for the purpose set forth.

3. In combination with an earth-box, A, the bottom of which is composed of two or more hinged sections, each of which sections has a crank, $r$, arranged to project from the end of the box, all of which are connected together, the secondary crank $l$, pitman $n$, and crank-shaft $r'$, the arm $p$ of which is bent, as described, when the pitman $n$ is connected with the arm $p$ at the bend of the joint, so as to provide a self-sustaining joint, which fastens by passing the vertical line, substantially as and for the purpose described.

JACOB PRICE.

Witnesses:
 GEO. H. STRONG,
 C. M. RICHARDSON.